INVENTORS.
ARTHUR A. BERG
HAROLD L. DOBRIKIN
CHARLES H. SCHREIBER
BY Parker & Carter
ATTORNEYS.

United States Patent Office 3,150,899
Patented Sept. 29, 1964

3,150,899
LOAD RESPONSIVE PRESSURE CONTROL
SYSTEM
Arthur A. Berg, Lincolnwood, Harold L. Dobrikin, Highland Park, and Charles H. Schreiber, Chicago, Ill., assignors to Berg Airlectro Products Co., Chicago, Ill., a corporation of Illinois
Filed Apr. 6, 1960, Ser. No. 20,372
5 Claims. (Cl. 303—22)

This invention relates to pressure control systems and has particular application, for example, to the brake systems of vehicles.

In some pressure systems having a pressure source, pressure applying means and a point of pressure application, a variable factor exists which can influence the amount of pressure required at said point for any given actuation of the applying means. An example is the air pressure system of a truck-trailer system. Presently such systems supply the full pressure needed to safely stop such vehicle when it is at its maximum loaded weight. A lightly loaded vehicle requires less pressure upon its brakes than does a heavily loaded vehicle. Vehicle operators presently attempt to supply the variable control needed by judicious application of the pressure through variation in movement of the brake pedal provided for brake application. This is entirely unsatisfactory, however. It leaves free rein to human error. Little or no "feel" is provided for the operator in such systems. Operators either apply too much pressure, when the vehicle is light or attempt to limit the pressure applied by timid "riding" of the brake pedal to prevent locking the wheels. Similarly, a gingerly application of pressure, when the vehicle is heavily loaded, produces unsafe delay in stopping the vehicle. It is accordingly one purpose of the invention to provide a pressure control system automatically adjusted and proportioned to the load of the vehicle and thus effective to deliver the pressure required, and only that amount, to the point of application upon any given actuation of the applying means.

One purpose of the invention is to provide a system effective to proportion the pressure applied to the brakes of a vehicle in response to variants in the load of the vehicle.

Another purpose is to provide a control system for pressure applied to the brakes of a vehicle.

Another purpose is to provide a control system effective to vary the pressure applied to the brakes of a vehicle in proportion to the load of the vehicle.

Another purpose is to provide a control system for vehicle brake pressure effective to provide a maximum control on the part of the vehicle operator.

Another purpose is to provide a control system for vehicle brake pressure which shall be automatic in operation.

Another purpose is to provide a control system for vehicle brake pressure which shall be substantially free from human error.

Another purpose is to provide a control system for vehicle brake pressure which shall be effective to proportion the pressure applied to the brake in relation to the load of the vehicle without change in present vehicle operator technique.

Another purpose is to provide a control system for vehicle brake pressure which shall be effective to proportion the pressure applied to the brake in relation to the load of the vehicle without difference in vehicle operator technique between a heavily and lightly loaded vehicle.

Another purpose is to provide a control system for vehicle brake pressure wherein the pressure applied to the brake is capable of immediate release.

Another purpose is to provide a control system for vehicle brake pressure which shall be substantially free of locking effect on the brakes of a vehicle.

Another purpose is to provide a control system for vehicle brake pressure which shall be substantially free of the effect of road shock and vibration of the vehicle.

Another purpose is to provide a pressure control system automatically effective to vary the pressure at its point of application in response to variation in an environmental factor having influence on the amount of pressure required.

Another purpose is to provide a control system for vehicle brake pressure capable of occupying a minimum total space.

Another purpose is to provide a control system for vehicle brake pressure having a mechanical weight-sensing element itself effective to absorb the effect of road shocks and vibration.

Another purpose is to provide a control system for vehicle brake pressure having a mechanical weight-sensing element including means providing an integral motion-transmitting and shock-absorbing element.

Another purpose is to provide, in a single housing, a fluid pressure control system responsive to the weight of a vehicle with which it is associated to vary the ratio of pressure applied to the brakes of such vehicle for any given actuation of brake-application means.

Another purpose is to provide a control system for vehicle brake pressure including means effective to actuate said system in response to loss or diminution of the pressure in the emergency system of such vehicle.

Other purposes will appear from time to time during the course of the specification and claims.

The present application is a continuation in part of our application Serial No. 780,359 entitled "Load Responsive Pressure Control" filed December 15, 1958, now abandoned.

I illustrate my invention more or less diagrammatically in the accompanying drawings, wherein.

Like parts are indicated by like numerals throughout the specifications and drawings.

Figure 1:
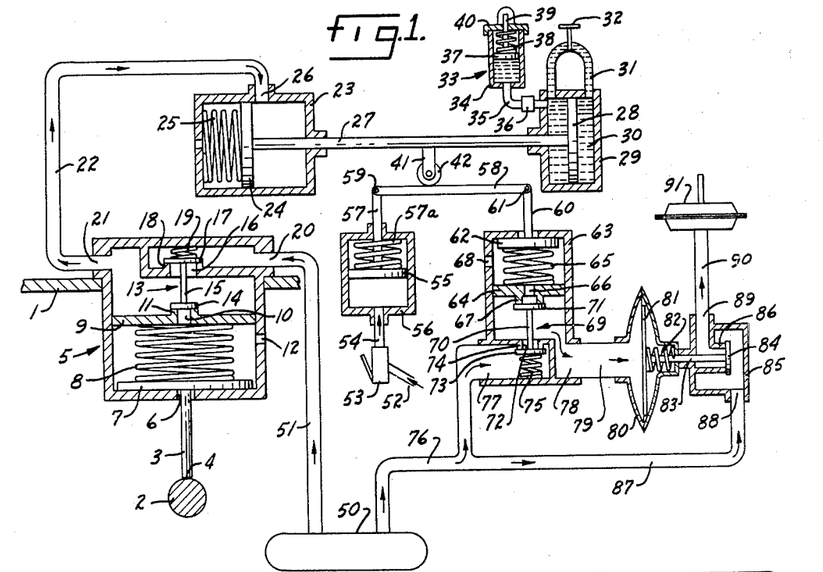
FIGURE 1 is a side elevation in partial cross section and constituting a schematic showing of one form of the invention.

Referring now to the drawings, and particularly to FIGURE 1, the numeral 1 illustrates generally a movable element, such as a floor portion of a truck or a truck trailer, for example. For convenience the invention may be described as employed in association with a truck. Accordingly, the numeral 2 indicates a truck axle. A rod 3 is positioned vertically above and has its lower end surface 4 resting upon, or otherwise in contact with tthe upper surface of the axle 2. A valve housing 5 is secured to the truck and may, for example, be secured to the truck bed 1. The rod 3 extends through an aperture 6 in the bottom wall of the valve housing 5 and carries at its upper end for reciprocation within the housing 5 a plate 7. A spring 8 is positioned axially of and within the housing 5, having its lower end seated upon the upper surface of plate 7 and its upper end operatively against the lower surface of a plate or piston element 9 reciprocal within the housing 5. The plate 9 is apertured as at 10 and carries a valve seat 11 uprising about the aperture 10. The housing 5 has its portion between the plate 7 and piston 9 vented to atmosphere as by the passage or outlet 12. A valve member 13 has a lower valve portion 14 positioned for seating upon the seat 11 within the housing 5. A stem 15 extends from valve portion 14 upwardly through an aperture 16 in an upper wall within the housing 5 and carries, at its upper end beyond said upper wall, a valve portion 17 positioned for seating upon a valve seat 18 uprising about and defining the aperture 16. A second upper wall of the housing 5 holds a spring 19 between its inner surface and the upper surface of valve portion 17 to urge the valve 17 upon its seat 18.

The valve housing 5 has an inlet passage 20 directed toward the aperture 16 and in communication therewith when valve 17 is not on its seat 18. The aperture 16 places inlet passage 20 in communication with the area within the housing above the piston 9. Said area above the piston 9 is in communication with an outlet passage 21 of the housing 5.

The structure thus described may, in view of its function in response to the movement of bed 1 caused by load in the vehicle, be termed, for convenience, a pilot valve or load-sensing or weighing device.

The line 22 places the outlet 21 in communication with the area inside a cylinder 23. Cylinder 23 has mounted for reciprocation therein a piston 24, on one side of which a spring 25 has its opposite ends in contact with a surface of piston 24 and an inner wall surface of cylinder 23. It will be observed that line 22 is effective to deliver air under pressure to that side of piston 24 opposite from the one in contact with spring 25, as indicated at 26. The side of the piston 24 to which air under pressure is delivered has secured thereto a rod 27 which itself extends outwardly from the cylinder 23 and carries at its opposite end a piston 28 reciprocal within a cylinder 29. The cylinder 29 has a supply of oil or other hydraulically effective fluid, indicated at 30, on both sides of piston 28. A by-pass channel 31 places the areas within cylinder 29 on opposite sides of piston 28 in communication one with the other for transfer of fluid in response to movement of piston 28 within cylinder 29. A metering device 32 is positioned within the channel 31 to adjust the resistance effected by the oil 30 to the movement of piston 28 within cylinder 29. An oil or fluid-replenishing device, indicated generally at 33, may comprise a housing 34 placed in communication with the area inside cylinder 29 by passage 35 in which a check valve 36 is positioned to preclude the return flow of fluid from cylinder 29 to replenishing element 33. A piston 37 is positioned above the fluid in member 33 and a spring 38 is positioned above the piston 37, the piston 37 carrying a rod 39 upwardly extending into and beyond a cap 40 for visual indication of need for refilling the member 33.

The structure comprising elements 28 through 40 may, for convenience, be described as a dampening means.

The rod 27 carries, as by the arm 41, a roller 42.

An air pressure reservoir, which may, for example, be the emergency reservoir in a truck-trailer vehicle, is indicated at 50. A line 51 delivers air under pressure from reservoir 50 to inlet 20 of the weighing valve 5.

Air under pressure may be delivered, as by the line 52 to a brake application, or pressure application valve 53. The pressure air delivered through line 52 may, for example, originate in the service lines of a trailer-truck combination. It will be understood, in such event, that the vehicle operator controls the application valve 53 in the operation of a brake pedal.

Air under pressure is delivered, as by line 54, to one surface of a piston 55 reciprocal within a cylinder 56. The opposite surface of piston 55 carries a rod 57 extending from the cylinder 56. A spring 57a is positioned within cylinder 56 to urge piston 55 against the action of pressure delivered thereagainst by line 54. A balance beam or rock arm 58 has one end pivotally connected to the outer end of rod 57, as at 59, and its opposite end pivotally connected to a second piston rod 60, as at 61. It will be observed that roller 42 is in contact with arm 58 and on the opposite side thereof from rods 57, 60.

The rod 60 carries at its opposite end a plate 62 reciprocally mounted within a cylinder 63. A valve piston 64 is also reciprocally mounted within cylinder 63 and a spring 65 is operatively positioned between plate 62 and piston 64 to urge the same in opposite directions. Piston 64 is apertured as at 66 and carries a valve seat 67 surrounding the aperture 66 and rising from the surface of piston 64 opposite to that against which spring 65 is operative. Cylinder 63 is vented to atmosphere between piston 64 and plate 62, as at 68. A valve member 69 has a stem 70 carrying at one end a valve portion 71 positioned for seating upon seat 67 to close aperture 66 and extending through a valve passage 72 within cylinder 63 to carry at its opposite end a valve portion 73 positioned for seating upon a valve seat 74 surrounding passage 72. A spring 75 is positioned within cylinder 63 and has its ends in contact with the outer surface of valve portion 73 and with cylinder 63 to urge valve 73 upon its seat 74.

A line 76 is arranged to deliver air under pressure from a source, such as reservoir 50, to an inlet 77 of cylinder 63 and thus to the valve passage 72 when valve 73 is off its seat 74. The air delivered under pressure through inlet 77 and through passage 72 enters cylinder 63 on that side of piston 64 opposite from spring 65 and this area is provided with outlet 78 to which is connected a line 79 arranged to deliver air under pressure emanating from cylinder 63 to a chamber 80 and to one side of a diaphragm 81 dividing said chamber.

The foregoing structure may, for convenience, be described as a proportioning segment of the system set forth.

The diaphragm 81 is urged against the pressure entering from line 79 by spring 82 and carries a rod 83 extending from the chamber 80 and carrying, at its outer end, a valve member 84 positioned within a relay valve housing 85 to seat upon a valve seat 86 therein.

A line 87 carries air under pressure from reservoir 50 to and into valve housing 85 as at 88. Air passing through valve housing 85 when valve 84 is off its seat is directed through outlet 89 and by line 90 to an air brake chamber 91. It will be understood that the air brake chamber is of standard construction and that the air delivered thereto is effective to apply the brakes to the vehicle.

Figure 2:
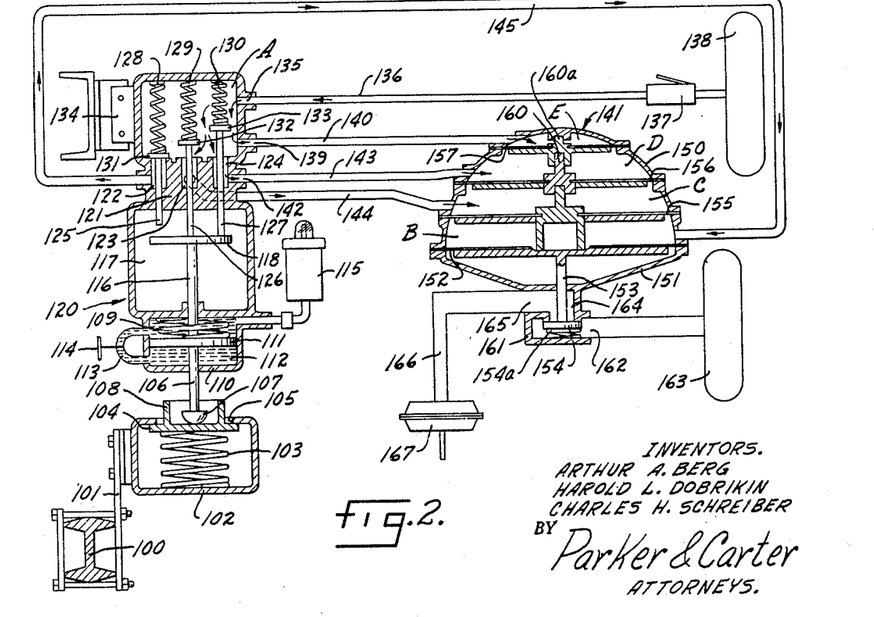
FIGURE 2 is a side elevation in partial cross section and illustrating another form of the invention.

Referring now particularly to FIGURE 2, the axle of a vehicle is indicated at 100. A frame or other suitable means 101 fixes to the axle 1 a housing 102 in which a yielding member, such as the road shock spring 103 is positioned. The spring 103 has one of its ends against an inner surface of housing 102 and its opposite end against the inner surface of a plate 104. The housing 102 is apertured in alignment with plate 104 and the spring 103 normally urges the plate 104 to close the aperture 105 in housing 102. Extending into the aperture 105 is a rod 106. A semispherical enlargement 107 is carried by the end of rod 106 for rocking or tilting contact with the outward face of plate 104. A cylindrical wall 108 may extend through aperture 105 and be attached to plate 104 to surround the head 107 and a portion of the stem 106.

Stem 106 extends into a dampening cylinder 110. A piston 111 is carried by stem 106 within cylinder 110 and a spring 109 is carried between the top side of piston 111 and the housing 110. A supply of fluid 112 is carried in cylinder 110 on both sides of piston 111. A by-pass channel 113 places the area within cylinder 110 on opposite sides of piston 111 in communication one with the other and a metering device 114 is provided in channel 113. A replenishing member 115 is in communication with chamber 110 and is constructed substantially along the lines of element 33 described above. A stem or rod 116 extends from piston 111 outwardly of chamber 110 and into chamber 117. A valve-actuating plate 118 is carried by the inner end of rod 116 for reciprocation within chamber 117.

The housing forming chamber 117 may be indicated generally at 120 and includes a valve-supporting center section 121. The section 121 has three valve passages 122, 123, 124 formed therein. Valve stems 125, 126, 127, of progressively increasing length, extend through passages 122, 123, 124 and have their ends extending into chamber 117 for sequential contact by plate 118 as it moves in one direction in chamber 117.

Each of the stems 125, 126, 127 carries at its opposite end a valve head positioned to seat upon a valve seat at the end of passages 122, 123 and 124. Springs 128, 129, 130 urge the valve heads 131, 132, 133 toward their respective seats. The housing 120 may be suitably secured to a vehicle, such as a truck, for example, by bracket 134.

The housing 120 has an inlet 135 to which an air pressure line 136 is connected. The line 136 is in communication with an application valve 137 which is in turn in controlled communication with a suitable source of air under pressure which may, for example, be the air pressure service reservoir of a truck-trailer combination, indicated at 138.

Housing 120 has an outlet 139 maintained in continuous communication, through the upper chamber A of housing 120 with source 138 and by means of line 140, with an upper portion of a diaphragm housing, indicated generally at 141. Valve passage 124 has an outlet 142 placed in communication, as by line 143, with an intermediate portion of diaphragm housing 141. The valve passage 123 has an outlet placed in communication, as by line 144, with a second intermediate portion of diaphragm housing 141. Valve passage 122 has an outlet placed in communication, as by line 145, with a lower portion of diaphragm housing 141. Thus the vari-dimensioned portions of diaphragm housing 141 are placed in communication with the source of air pressure 138 through the described valve passages, chamber A, line 136 and valve 137.

The diaphragm housing 141 comprises an upper shell 150 and a lower shell 151. The shells 150, 151 are divided by a diaphragm 152 having secured thereto a valve stem 153 extending outwardly from the shell 151 and carrying at its outer end a valve head 154.

The upper shell 150 is divided into four chambers, the lower chamber, indicated at B, being bounded by the parallel diaphragms 152, 155, the diaphragm 155 being of less area than diaphragm 152. The diaphragm 155 forms with the shell 150 and a parallel, spaced diaphragm 156 a second chamber C and is of less area than diaphragm 155. A diaphragm 157 forms with the parallel, spaced diaphragm 156 a third chamber D and is of less area than diaphragm 156. The diaphragm 157 also forms, with the upper portion of shell 150, a fourth chamber E. It will be observed that line 145 is in communication with chamber B; line 144 is in communication with chamber C; line 143 is in communication with chamber D; and line 140 is in communication with chamber E. Interfitting elements, indicated generally at 160, engage the diaphragms 152, 155, 156, 157 together for unitary movement in one direction and are aligned with stem 153 to which diaphragm 152 is secured. The elements 160 and stop 160a limit movement of any one of the diaphragms thus described is effective to cause movement of the stem 153.

The valve 154 is positioned within a valve housing, which in a truck-trailer air system may be termed an "emergency relay valve housing" 161. A spring 154a may be used to urge the valve 154 against the housing 161. An inlet 162 is placed in communication with a source 163 of pressure, such as an emergency reservoir in a truck-trailer vehicle. The area within the housing 161 has a valve passage 164 normally closed by the valve head 154 and an outlet 165 on the opposite side of the valve head 154 from the inlet 162. The outlet 165 is placed in communication, as by the line 166, with a brake chamber 167 of known construction for brake application, any excess pressure being exhausted in any desired manner.

Figure 3:
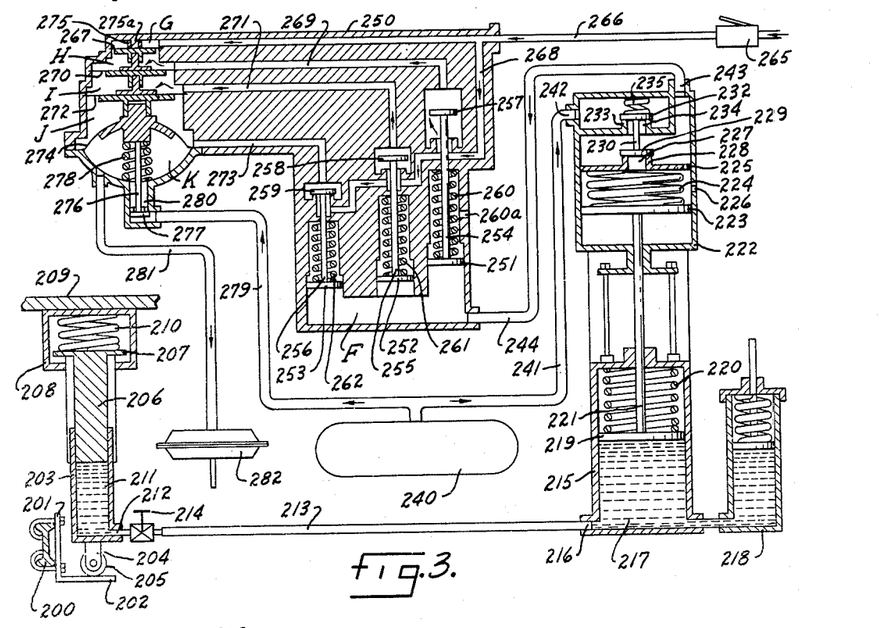
FIGURE 3 is a side view in partial cross section and illustrating, schematically, a third form of the invention.

Referring now to FIGURE 3, an element fixed in relation to the ground for example, such as a vehicle axle, is illustrated at 200. A frame member 201 is secured to the element 200 and carries a plate portion 202 laterally disposed in relation thereto. An upwardly open cylinder 203 has secured to the outer surface of its bottom wall a bracket 204 on which is rotatably mounted a roller 205 in alignment, and normally held in contact, with the upper surface of plate 202. Partially inserted into the open upper end of cylinder 203 is an elongated piston 206. The opposite end of piston 206 carries a plate 207 reciprocally mounted within a housing 208 which is in turn secured to an element movable in relation to element 200, such as a portion of a truck chassis illustrated schematically at 209. A spring 210 is positioned within housing 208 above the plate 207 and is effective to urge the plate 207 and piston 206 downwardly or toward plate 202.

Movement of the piston 206 into cylinder 203 is resisted by a supply of fluid 211 in cylinder 203 and an outlet 212 is positioned adjacent the bottom of cylinder 203 in communication with the supply of fluid 211. A line 213 is connected to outlet 212 and has associated therewith an adjusting orifice 214. Line 213 is in communication with a cylinder 215, as at 216, and thus with a supply of fluid 217 and cylinder 215. A fluid replacement reservoir, indicated generally at 218, is in communication with chamber 215 and with fluid 217 therein and is constructed generally along the lines described in relation to element 33, above.

Reciprocal within cylinder 215, above the level of and in contact with the fluid 217, is a piston 219. A spring 220 is operative against the piston 219 to urge it against the fluid 217. A rod 221 is secured to piston 219 and extends through the upper wall of cylinder 215 and into a cylinder 222. Connected to the upper end of rod 221 and reciprocal within cylinder 222 is a plate 223. A spring 224 urges plate 223 and a valved piston 225 in opposite directions within chamber 222. Chamber 222 is vented to atmosphere between plate 223 and piston 255 as at 226.

Piston 225 is apertured as at 227 to provide a valve seat 228 upon which a valve head 229 is arranged to seat. The valve 229 carries a stem 230 extending through a second valve passage 234 within cylinder 222 and carries at its upper end a valve head 232 arranged to seat upon a valve seat 233 to close a valve passage 234. A spring 235 is positioned in cylinder 222 to urge the valve head 232 toward its seat 233.

A source of fluid pressure, such as the air reservoir 240, is placed in communication, as by the line 241, with an inlet 242 into cylinder 222 above the valve head 232. Cylinder 222 has an outlet 243 in communication with the area within chamber 222 between the valve passage 234 and plate 225. Outlet 243 is placed in communication with a housing 250, as by line 244, arranged to deliver air under pressure into a valve chamber F in housing 250. The chamber F has three valve pistons 251, 252, 253 therein. The valve pistons 251, 252, 253 have stems 254, 255, 256, respectively, of decreasing length. Each of said stems extends through its own valve passage in housing 250 and carries at its upper end a valve head arranged to control its associated valve passage. The valve heads are indicated, respectively, at 257, 258 and 259. Springs 260, 261, 262 are positioned to urge the valve heads 257, 258, 259, respectively, toward their seats to close their associated valve passages, the springs 260, 261, 262 being of varying strengths to effect sequential opening of valves 257, 258 and 259.

An application valve 265 receives air under pressure from a suitable source, for example from the service line of a truck-trailer combination. Said pressure is conveyed, as by line 266, into housing 250, the line 266 being arranged to deliver said air under pressure into a top chamber G above a diaphragm 267. A branch passage 268 communicates with line 266 to deliver air, under pressure, to the valve passage controlled by valve head 257. When valve 257 is off its seat, said air under pressure is permitted to flow through passage 269 into a chamber H between diaphragm 267 and a diaphragm 270 having an area greater than that of diaphragm 267. A continuation of passage 268 is positioned to deliver air under pressure to the valve passage controlled by valve head 258 and when valve 258 is off its seat, said air under pressure is conveyed by passage 271 into a chamber I between diaphragm 270 and a third diaphragm 272 having an area greater than that of diaphragm 270. A further continuation of passage 268 is positioned to deliver air under pressure to the valve passage controlled by valve head 259, and when valve 259 is off its seat, to deliver said air under pressure through passage 273 into a chamber J between diaphragm 272 and a fourth diaphragm 274 having an area greater than that of diaphragm 272.

Each of the diaphragms 267, 270, 272 and 274 are inter-engaged, as by means 275, to control a valve stem 276 extending outwardly from housing 250 and carrying at its outer end a valve head 277 and a stop 275a limits their movement in the direction urged by spring 278. Spring 278 urges the valve head 277 on its seat to close an air pressure line 279 extending from reservoir 240. When valve head 277 is moved off its seat by movement of any of the diaphragms just described, air under pressure entering the chamber 280, in which valve 277 is positioned, is directed into a chamber K beneath diaphragm 274 and thence through a line 281 to a brake pressure chamber 282 of known construction.

Figure 4:
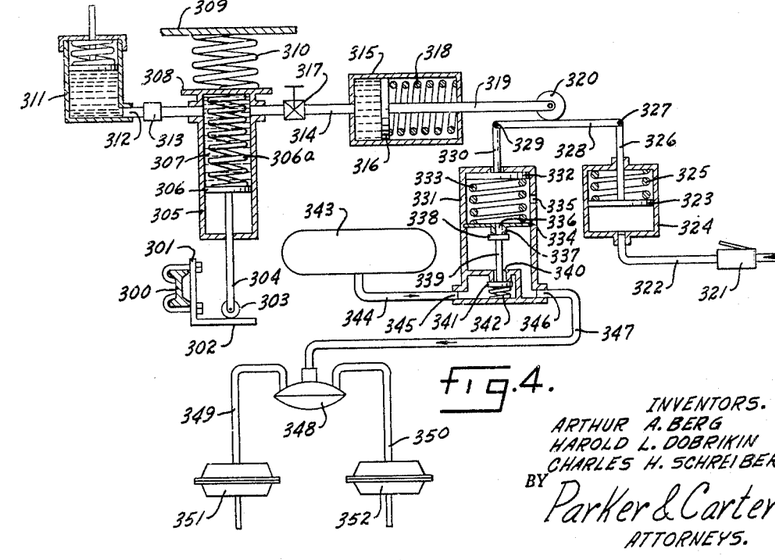
FIGURE 4 is a view in partial cross section and illustrating, schematically, a fourth form of the invention.

Referring now to FIGURE 4, the numeral 300 indicates a relatively fixed element such as an axle of a vehicle such as a truck. A frame 301 is fixed on element 300 and carries a horizontally disposed plate portion 302. A roller 303 rests upon and in contact with the upper surface of plate 302 and a rod 304 is connected to roller 303 and extends upwardly into a cylinder 305 to carry at its upper end, for reciprocation within the chamber 305, a piston 306. A supply of fluid 307 is carried within cylinder 305 above piston 306. Cylinder 305 has an upper wall 308 spacedly positioned beneath a portion of the vehicle body, such as that illustrated schematically at 309, and a spring 306a is in cylinder 305 above piston 306 and a spring 310 is positioned between the vehicle portion 309 and the outer surface of wall 308 of chamber 305. A fluid-replenishing device 311 is in communication, by means of line 312, with the fluid-filled area above piston 306 in cylinder 305, the check valve 313 being positioned in line 312 between device 311 and cylinder 305. Device 311 corresponds substantially to that illustrated at 33 in FIGURE 1.

A line 314 places the area above piston 306 in cylinder 305 in communication with the area inside a cylinder 315 on one side of a piston 316 reciprocal therewithin. An adjustment or metering orifice 317 is associated with line 314 between cylinders 305 and 315. A spring 318 is positioned in cylinder 315 to urge piston 316 against the fluid in cylinder 315. Piston 316 carries a rod 319 which extends outwardly from cylinder 315 and carries at its outer end a roller 320.

An application means such as valve 321 receives air under pressure from any suitable source, for example the service reservoir in a truck-trailer combination, and delivers said air under pressure, as by means 322, to one side of a piston 323 in a cylinder 324. A spring 325 in cylinder 324 urges piston 323 against said air pressure. Piston 323 carries a rod 326 which extends outwardly from cylinder 324 and has its outer end pivotally connected, as at 327, to a scale beam or rocker arm 328.

Pivotally connected to the opposite end of arm 328, as at 329, is an outer end of a rod 330 which has its opposite end extending into a cylinder 331 and carrying for reciprocation therewithin a plate 332. It will be observed that roller 320 is in contact with the surface of arm 328 opposite to that from which rods 326, 330 extend to serve as a movable fulcrum for arm 328.

Within cylinder 331 a spring 333 is positioned between plate 332 and a valved piston 334. The cylinder 331 is vented to atmosphere between plate 332 and piston 334 as at 335. Piston 334 is apertured as at 336 and an annular flange surrounds aperture 336 to form a valve seat 337 upon which a valve 338 is positioned to be seated. A stem 339 extends from valve head 338 through a valve passage 340 formed within the cylinder 331 and carried at its opposite end a valve head 341. A spring 342 is positioned to urge the valve heads 341, 338 toward closed position. A fluid pressure reservoir 343 has a line 344 extending therefrom for delivery of fluid pressure, as at inlet 345, to cylinder 331 and specifically to valve passage 340 when valve 341 is off its seat. Fluid pressure passing through passage 340 escapes from cylinder 331 through outlet 346 and is directed, as by line 347, into a relay valve 348 from whence branch lines 349, 350 carry said fluid pressure to a point of application, such as brake chambers 351, 352 of known construction.

Although an operative form of the device has been shown, the invention is not limited to the particular details described. While the invention finds ready application to vehicle brake systems, it may be useable in other contexts. Many changes may be made in the form, shape and arrangement of parts without departing from the spirit of the invention. For example, whereas I have shown and described a number of individual separate elements, it will be understood that many of the elements shown and described above can, and would normally be incorporated into a single housing structure. Similarly, fluids other than air may be employed without departing from the nature and spirit of the invention. We, therefore, desire to be limited only by the scope of the appended claims.

Figures 5, 8:
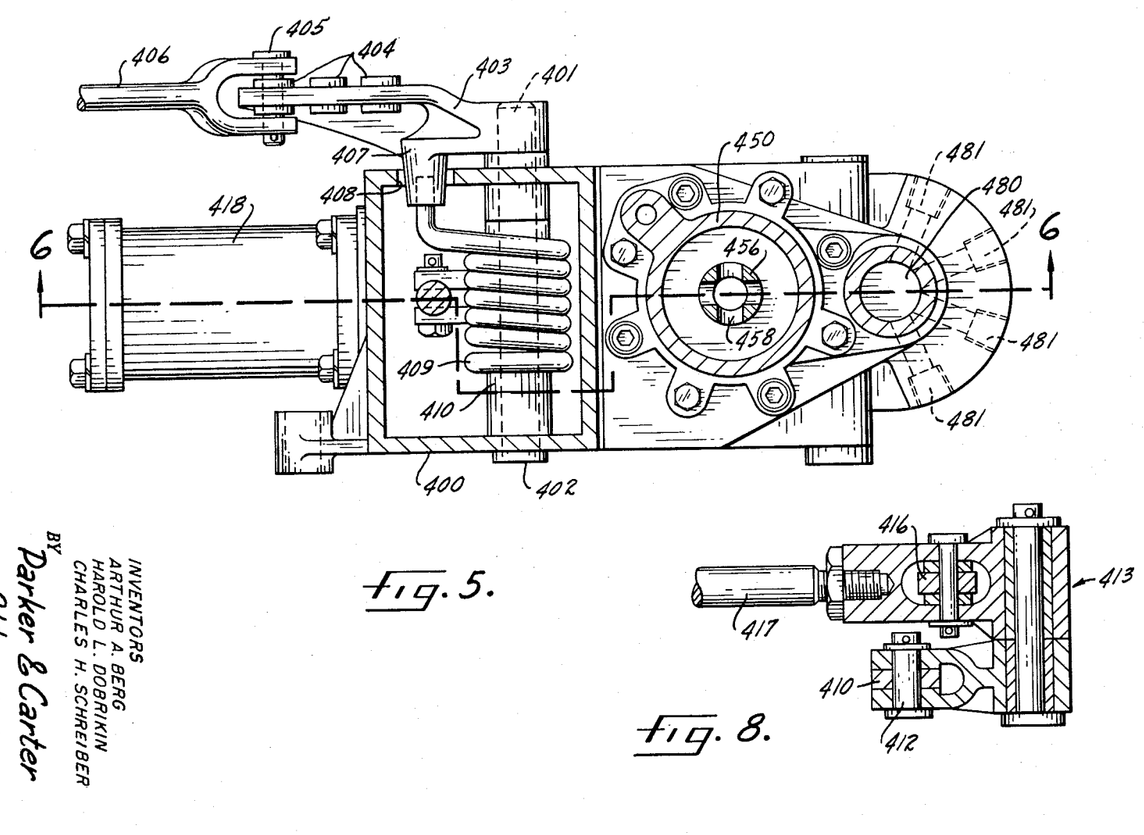
FIGURE 5 is a top plan view, in partial cross section, of another form of the invention.
FIGURE 8 is a detail view taken on the line 8—8 of FIGURE 6.

Referring now, for example, to FIGURE 5 a housing is indicated generally at 400. Pivoted outside the housing 400, for example, on the outward-extending end 401 of fixed cross shaft 402 is an arm 403. For adjustment purposes, the arm 403 has a plurality of longitudinally spaced attaching apertures indicated at 404. Pivotally connected, as by pin-and-clevis means 405 associated with one of the apertures 404, is an arm 406, it being understood that arm 406 is suitably connected to the body of the vehicle with which the invention is employed. Thus, the weight of and in the vehicle body directly influences, through arm 406, the rotational position of arm 403 on shaft 402.

Figure 6:
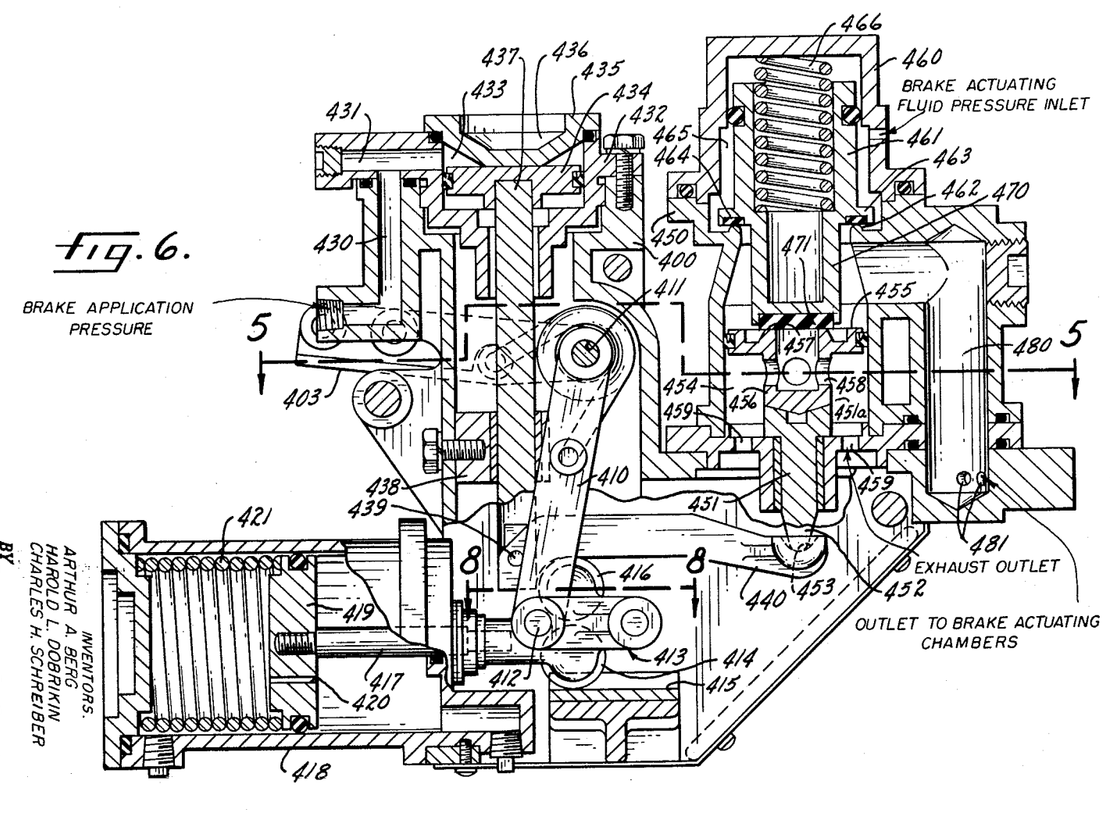
FIGURE 6 is a cross sectional view taken on the line 6—6 of FIGURE 5.

Arm 403 has a laterally extending socket portion 407 extending through an arcuate slot 408 formed in the wall of housing 400. A spring 409 has one of its ends secured in socket 407 within housing 400. The spring 409 is coiled about shaft 402 within housing 400 and has its opposite end, as best seen in FIGURE 6, secured intermediate the ends of an internal arm 410, itself pivoted at its upper end, as at 411, to shaft 402.

The opposite end of arm 410 is pivotally connected as at 412 to a fulcrum member, indicated generally at 413. The member 413 has a support roller 414 rotatably supported on a flat surface 415 secured within housing 400. A fulcrum roller 416 is rotatably mounted on member 413 above roller 414.

A shaft 417 has one of its ends secured to member 413 and extends outwardly from housing 400 into a sub-housing 418 in which piston 419 is reciprocally mounted for movement with shaft 417 and fulcrum member 413. The piston 419 has a bleed aperture 420 communicating with the areas on opposite sides of piston 419 within cylindrical housing 418. A spring 421 urges piston 419 toward housing 400.

A fluid pressure entry passage 430 is formed in housing 400 for communication with a passage 431 formed in a cylindrical insert member 432 and communicating with a chamber 433 therein above a piston 434 mounted for reciprocation within chamber 433. A closure cap 435 closes chamber 433 above piston 434 and includes a depressed or concave central portion 436 serving as an upper stop means for piston 434. Piston 434 has an actuating engagement with piston rod 437 slidably supported within housing 400 by a bracket 438 and pivotally secured at its lower or opposite end, as at 439, to a rock arm 440, the lower surface of which is fulcrumed on fulcrum roller 416.

A sub-housing 450 is secured to housing 400 and has a push rod 451 extending outwardly therefrom and having its outer end 452 received in a socket 453 at the opposite end of rock arm 440 from the movable fulcrum or pivot point 439. The push rod 451 extends into a chamber 454 in sub-housing 450 in which a valve piston 455 is reciprocally mounted. The piston 455 has an axial extension 456 hollowed to provide, as the parts are shown in the drawings, an upwardly open valve seat 457 and apertured in its side walls as at 458 for communication with chamber 454. Vent passages 459 are formed in sub-housing 450 and communicate with chamber 454.

A downwardly open chamber-forming cap member 460 is secured to housing 450 and has reciprocally mounted therein a second valve piston 461. A valve seat 462 is formed in alignment with the otherwise-open end of cap housing 460, and piston 461 carries an annular flange 463 serving as a valve member and carrying an annular valve element 464 positioned for seating upon valve seat 462 to close the chamber 465 formed in cap housing 460 about piston 461. A yielding means, such as spring 466, is positioned in cap 460 to urge the valve element 464 on its seat 462. Piston 461 has an axial elongation 470 extending into chamber 454 and carrying a valve element 471 for seating upon valve seat 457 and for actuating contact of piston 461 with piston 455.

A fluid pressure passage 480 communicates with the chamber 454 above piston 455 and beneath valve seat 462. A plurality of outlet passages, such as those indicated at 481, may be formed in sub-housing 450 for communication with passage 480, and the brake-actuating chambers (not shown) normally employed in association with the brake system of a vehicle. For example, four such passages 481 are shown in FIGURE 5, it being understood that any lesser number may be employed, those passages 481 not being required simply being closed off.

Figure 7:
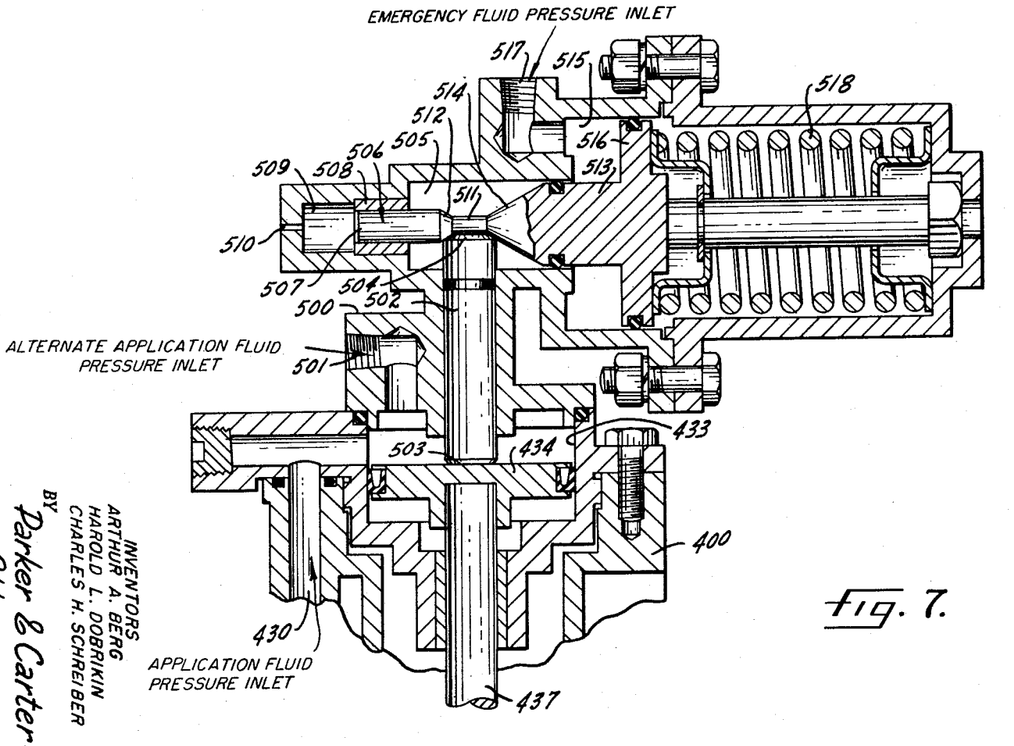
FIGURE 7 is a side cross-sectional view, on an enlarged scale, illustrating an emergency pressure element of the invention.

Referring now to FIGURE 7, there is illustrated a means effective to cause automatic operation of the device of the invention to apply the brakes of a vehicle in response to a loss of pressure in the emergency air pressure system of the vehicle. As seen in FIGURE 7, cap 435 has been removed and an adapter fitting 500 has been substituted therefor. The adapter 500 has an alternate inlet fluid pressure passage 501 communicating with chamber 433 above piston 434. An actuating rod 502 is slidably mounted in member 500 and has its lower end in actuating contact with the upper surface of piston 434, as indicated at 503. The opposite end of rod 502 is champfered, as indicated at 504, and extends into a laterally disposed chamber 505 in which a second actuating rod member 506 is slidably mounted. The rod 506 has a cylindrical end portion 507 slidably received in a seal 508 and extending into a sub-chamber 509 with which a reduced vent passage 510 communicates.

Intermediate the ends of rod 506 is a reduced cylindrical portion 511, a conical surface 512 joining rod segments 507 and 511. An enlarged cylindrical end portion 513 of rod 506 is joined to segment 511 by a larger conical surface 514 and rod segment 513 extends into an enlarged chamber 515 in which piston portion 516 of rod member 506 is reciprocally mounted. Emergency fluid pressure is admitted through entry passage 517 into chamber 515 on one side of piston portion 516. A yielding means such as spring 518 is positioned in chamber 515 on the opposite side of piston 516 and is operatively engaged therewith to urge the piston 516 and the integral rod 506 secured thereto to the left as the parts are shown in the drawings. It will be observed that champfered end portion 504 of rod 502, as illustrated in FIGURE 7, is held in engagement with the rod surfaces 511, 512 and 514 when piston 434 is in its uppermost position.

Figures 9, 10:
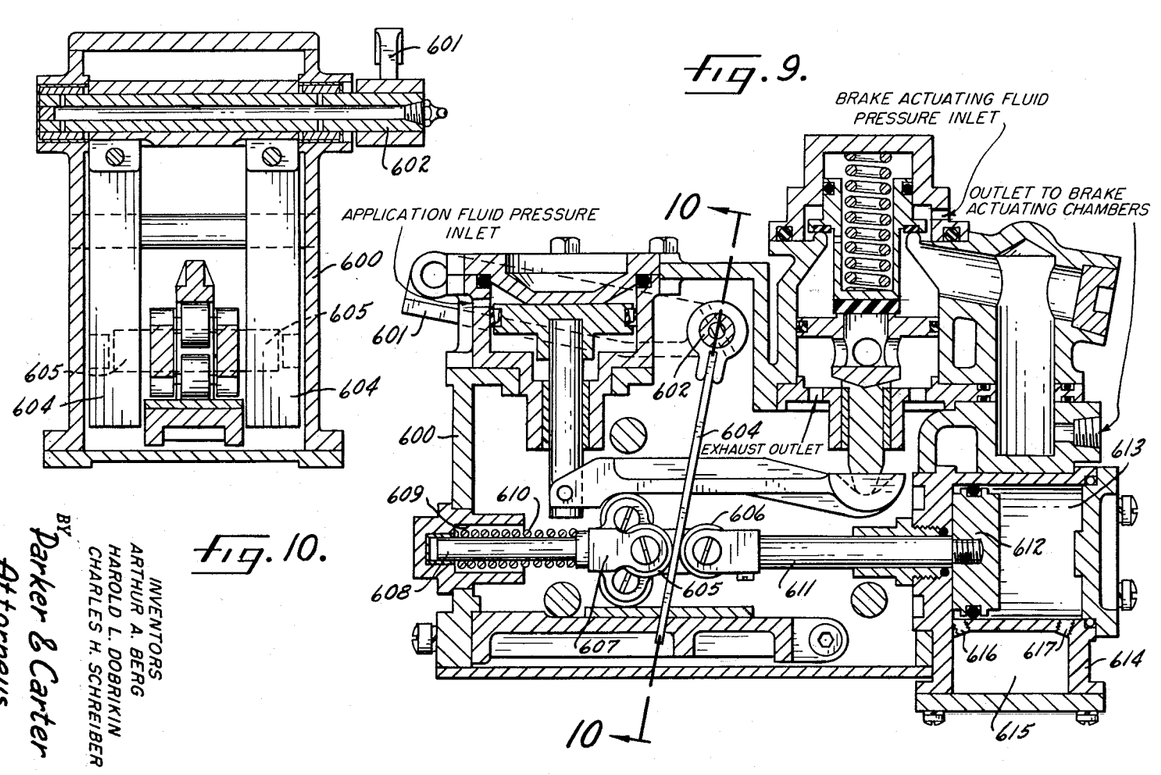
FIGURE 9 is a side view, in partial cross section, illustrating another form of the invention.
FIGURE 10 is a view taken on the line 10—10 of FIGURE 9.

Referring now to the form of the invention illustrated in FIGURES 9 and 10, a housing generally indicated at 600 has a somewhat reduced over-all configuration in comparison with that of housing 400. An arm 601 corresponding in function and over-all configuration with arm 403, above described, is secured for rotational movement with a lateral shaft 602 extending into and rotatable in housing 600, as best seen in FIGURE 10. The shaft 602 has secured thereto and downwardly extending therefrom a pair of leaf spring elements indicated at 604, the lower ends of which are received between a pair of rollers 605, 606 secured to fulcrum member 607.

Member 607 corresponds substantially to fulcrum member 413, above described, except that a shortened shaft 608 is secured at one end thereof and extends into a socket 609 in which is received a spring 610 coiled about shaft 608 to urge member 607 to the right, as the parts are shown in the drawings. A second shaft 611 extends in the opposite direction from member 607 and carries at its outer end a piston 612 reciprocal in a chamber 613 formed in a sub-housing 614 secured to housing 600. A surge chamber 615 is positioned adjacent chamber 613 and a set of restricted passages 616, 617 place chambers 613 and 615 in communication on opposite sides of piston 612. The remaining elements of FIGURES 9 and 10, except for reductions in size and changes in configuration, are substantially identical to corresponding elements described above and will, therefore, not be further described.

The use and operation of the invention are as follows: Referring particularly to FIGURE 1, for example, the load placed in the vehicle causes a movement of the vehicle bed 1 and housing 5 downwardly toward axle 2. The weight of the vehicle body causes such movement initially or, if desired the parts could be set to incorporate the body weight originally. Resultant compression of spring 8 causes a lifting of valve head 17 off its seat 18, thus permitting fluid, such as air under pressure, to pass from reservoir 50 through inlet 20, valve passage 16 and through outlet 21 and line 22 into cylinder 23. The pressure entering cylinder 23 causes movement of piston 24 against spring 25 and a resultant movement, to the left as the parts are shown in the drawings, of rod 27 and with it roller 42. The fluid 30 in cylinder 29 serves to dampen the effect of minute fluctuations in the pressure entering cylinder 23, which may result from occasional road shock or vibrations, which could cause a movement of bed 1 toward axle 2 and the resultant delivery of minute increments of pressure to cylinder 23. Thus, roller 42 is positioned in direct relation to the load placed in the vehicle and this is accomplished automatically.

Thereafter, when the operator depresses the foot pedal provided for application of brake to the vehicle, the application valve 53 is opened to permit fluid pressure to enter cylinder 56 on one side of piston 55 and to move piston 55 against the action of spring 57a and thus to move rod 57 outwardly of cylinder 56. Movement of the rod 57 causes a rocking of arm 58 about the fulcrum provided by roller 42 and a resultant movement of rod 60 and plate 62, against the action of spring 65 within cylinder 63. The latter action causes an unseating of valve head 73 from its seat 74 to open passage 72 and thus to permit fluid pressure to flow from reservoir 50 through outlet 78 of cylinder 63 and into the diaphragm chamber 80 to move diaphragm 81 and rod 83 against the action of the spring 82 and thus to unseat relay valve head 84. As valve 84 leaves its seat 86 fluid pressure from reservoir 50 is permitted to pass through relay valve housing 85 and line 90 into the brake chamber 91 to apply the brakes to the vehicle.

Thus the pressure applied to the brake, for any given amount of application of force to the brake pedal by the vehicle operator, is directly proportioned to the load in the vehicle by the weighing or sensing elements illustrated generally by the numerals 1–50. In so doing the sensing structure positions a fulcrum 42 at any one of an infinite number of points on rock bar 58.

Thereafter actuation of the application valve 53 produces a relative movement between piston 55 and plate 62, depending upon the position of fulcrum 42 along bar 58. As illustrated, for example, fulcrum 42 is closer to rod 57 than to rod 60 and a given amount of pressure applied to piston 55 will produce a greater movement of plate 62 than would be the case if fulcrum 42 were at a position further to the right, as the parts are shown in the drawings, from that illustrated.

Prompt and immediate release is provided automatically through valve passages 10, 66 and vent passages 12, 68.

The amount of dampening action is controllable by means of metering device 32 and oil supply 30 is maintained by element 33, normal servicing of the system requiring only an occasional replacement of oil in member 33, as indicated by the visual upper portion of rod 39.

Referring now to FIGURE 2, the weight and/or load of the vehicle causes a downward movement of housing 120. Downward movement of housing 120 produces a resultant rise of plate 118 therewithin, dampening chamber 110 being effective to limit such movement in reaction to road shock or vibration. With a given weight, plate 118 will contact first the elongated stem in passage 124. Continued upward movement, in response to greater weight of the vehicle, produces sequential contact of plate 118 with the stem in passage 123 and that in passage 122.

Diaphragm chamber 141 has an upper chamber E continuously open to receipt of fluid pressure directly upon actuation of the application valve 137 by the vehicle operator through the means of a brake pedal. Thus a minimum braking action is provided at all times.

As passage 124 is held open by the weight in the vehicle, fluid pressure is directed through housing 120 to the larger chamber D in member 141. Similarly, as the passages 123 and 122 are held open by further increased weight of the vehicle, fluid pressure is directed into the still larger chamber C and B, respectively, in member 141. As fluid pressure is directed into a larger chamber in member 141 and effect thereof is to cancel out the effect of pressure in the chamber immediately thereabove and to create a greater movement downwardly, as the parts are shown in the drawings, of stem 153 and valve 154 in response to the application of pressure to the larger, lower diaphragm. Unseating of valve 154 permits passage of fluid pressure from source 163 to brake chamber 167 and a consequent application of brake to the vehicle.

Referring now to FIGURE 3, a still further variant system is illustrated. The load of the vehicle applied at 209 causes movement of piston 206 into cylinder 203 and a consequent forcing of fluid 211 outwardly therefrom and into cylinder 215 beneath piston 219. Thus piston 223 is raised in cylinder 222 in response to the load existing at 209. Raising of piston 223 causes an unseating of valve 232 and a consequent delivery of fluid pressure from reservoir 240 through line 241, valve passage 234, outlet 243 and line 244 to housing 250 beneath valve pistons 251, 252 and 253. The consequent unseating of valves 257, 258 and 259 individually or in sequential combination produces a delivery of pressure to the diaphragms of gradually increasing area in the manner described with relation to FIGURE 2, above. Brake relay valve 277 is unseated thereby to deliver fluid pressure in amounts desired through chamber K and line 281 to brake chamber 282.

Immediate automatic release is provided through passage 227 and vent 226 formed in piston 225 and cylinder 222, respectively. The springs are positioned in housing 250 in chambers vented to atmosphere, as indicated in relation to one of said chambers at 260a.

Referring now to FIGURE 4, the weight exerted at 309 causes relative movement of piston 306 into cylinder 305 and a consequent delivery of fluid pressure to one side of piston 316 in cylinder 315. Thus fulcrum 320 is positioned at one of an infinite number of points along rock bar or scale beam 328. Thereafter actuation of application valve 321 by the operator produces an upward movement, as parts are shown in the drawings, of piston 323 and a consequent rocking of bar 328 about fulcrum 320 to produce a relative reactionary movement of rod 330 and a consequent unseating of valve 341 to permit passage of fluid pressure from source 343 through cylinder 331 and to brake chambers 351, 352. As indicated above in relation to the system illustrated in FIGURE 1, the positioning of fulcrum 320 controls the relation between the movement of piston 323 and that of plate 332 and consequently controls the amount of pressure passing through valve passage 340 and applied to the brake chambers 351, 352 in proportion to the amount of actuation of application valve 321 by the vehicle operator.

Referring now to FIGURES 5 and 6, it will be understood that the weight of the vehicle influences the position of arm 403. Movement of arm 403 is transmitted through coil spring 409 to arm 410 to position fulcrum 416 along the undersurface of rock arm 440. The spring 409 is effective to absorb, within itself, minute frequent movements of arm 403 resulting from road shock or vibration of the vehicle, without causing corresponding repositioning of fulcrum 416. The more permanent movement of arm 403 to a position responsive to the weight of the vehicle is effective, nonetheless, through spring 409 to properly position fulcrum 416.

Brake application pressure, such as that created by the operator in pressing the brake pedal of a vehicle, enters through passage 430 to cause downward movement of piston 434 and rod 437 and a corresponding counterclockwise rotation of rock arm 440, as the parts are shown in the drawings, on fulcrum 416. Such movement of arm 440 causes an upward movement of push rod 451, piston 455 and valve piston 461 to unseat valve element 464 from seat 462. It will be understood that a suitable entry passage is formed in cap 460 to admit brake-actuating fluid pressure to chamber 465, and that unseating of valve element 464 permits passage of such brake-actuating fluid pressure through valve 462 and into passages 480, 481 for delivery to the brake-actuating chambers such as those illustrated at 351, 352 in FIGURE 4.

When brake-application pressure is released from passage 430 and thus from the chamber 433 above piston 434, the spring 466 is effective to close valve 464, 462 and to return the parts to the position illustrated in FIGURE 6. Excessive fluid pressure in passages 480, 481, remaining after release of application pressure from passage 430, acts upon the upper surface of piston 455 to move the same downwardly, the piston 455 and push rod 451 being separated, as indicated at 451a, for such purpose. Downward movement of piston 455, when valve 464 is on its seat, causes a separation of value seat 457 from valve element 471 and a consequent passage of such excessive remainder air pressure through valve 457 and apertures 458 into vent chamber 454 and through vent openings 459.

Referring now to FIGURE 7, emergency fluid pressure is maintained in chamber 515 through passage 517 behind piston 516 to hold the parts in the position illustrated in FIGURE 7. In such position the spring 518 is held in compressed configuration and the reduced portion 511 is positioned over shaft 502 to provide for maximum retraction of shaft 502 when piston 434 is in its uppermost position. Upon failure, or diminution below a predetermined point, of emergency fluid pressure in chamber 515, the spring 518 is effective to urge piston 516 and rod 506 to the left, as the parts are shown in the drawings. The conical surface 514 is thus caused to ride upon the champfered end 504 of rod 502 and to move the rod 502 downwardly, as the parts are shown in the drawings, and thus to move piston 434 downwardly in the same manner as above described in relation to the flow of normal application pressure into chamber 433 above piston 434. Just as in the latter case, the downward movement of rod 502 causes immediate application of the brakes of the vehicle to which the invention may be attached.

Referring now to FIGURES 9 and 10, a variant form of means for damping the movement of a fulcrum is illustrated. In FIGURES 5 and 6, the piston 419 having reduced bleed passage 420 therein, is effective to cause such damping. In FIGURES 9 and 10, a surge or damping chamber 615 is supplied, it being understood that movement of fulcrum 607 to the right, as the parts are shown in the drawings, produces a corresponding movement of piston 612 in chamber 613 and the forcing of fluid pressure in chamber 613 through restricted passage 617 into surge chamber 615 and the resulting transfer of such fluid pressure into chamber 613 behind piston 612, the reverse being true in response to retrograde action of piston 612.

In FIGURES 9 and 10, I provide a variant form of means for both transmitting the effect of varying weights in the vehicle to which the invention is applied and for absorbing road shock and vibrational effects upon such vehicle body. The arm 601 when caused to move minutely in response to road shock and vibration begins to cause a corresponding rotation of shaft 602 and leaf spring members 604 about the axis of shaft 602. Since the members 604 are leaf springs and fulcrum movement is resisted by members 612–615 and 610, such minute influences are absorbed in members 604. Movements of arm 601 caused by actual or "permanent" variances in the weight in and of the vehicle body secured thereto, however, are effective to rotate arms 604 permanently to a new, corresponding position about the axis of shaft 602 and thus to cause a permanent shifting or movement of members 604 and fulcrum 607.

While the device of FIGURE 7 is illustrated therein as being attached to the form of housing illustrated in FIGURES 5 and 6, it will be realized that the device of FIGURE 7 may as easily be secured to housing 600 in a corresponding position above piston 434.

We claim:
1. In a vehicle having a fixed portion and a portion movable in relation to said fixed portion in response to variation in load on said movable portion and in response to vibration, a source of fluid pressure, a set of pressure-actuated brakes, and automatic means for varying the amount of pressure applied to said brakes from said source in response to the movement of said movable portion resulting from changes in load thereon while preventing variation in applied pressure in response to minute movement of said movable portion resulting from vibration, said automatic means comprising a valve between said source and said brakes, a rock bar having one of its ends in actuating engagement with said valve, a piston responsive to said pressure source and having an actuating engagement with the opposite end of said rock bar, a fulcrum movable along said rock bar and means for moving said fulcrum, said last-named means including a torsion spring having one of its ends secured to one of said vehicle portions and its opposite end connected to said fulcrum and automatic means for actuating said piston in response to diminution of pressure in said source, said last named means including a cylinder, an emergency piston movable in said cylinder, a pressure inlet on one side of said emergency piston communicating with said source, shaft means on said side of said piston and positioned for operating contact with said first named bar-actuating piston and yielding means on the opposite side of said piston effective to urge said shaft means into actuating contact with said first named piston in response to diminution of said source pressure below a predetermined level.

2. In a vehicle having a fixed portion and a portion movable in relation to said fixed portion in response to variation in load on said movable portion and in response to vibration, a source of fluid pressure, a set of pressure-actuated brakes, and automatic means for varying the amount of pressure applied to said brakes from said source in response to the movement of said movable portion resulting from changes in load thereon while preventing variation in applied pressure in response to minute movement of said movable portion resulting from vibration, said automatic means comprising a valve between said source and said brakes, a rock bar having one of its ends in actuating engagement with said valve, a piston responsive to said pressure source and having an actuating engagement with the opposite end of said rock bar, a fulcrum movable along said rock bar and means for moving said fulcrum, said last-named means comprising a shaft rotatably mounted on one of said vehicle portions, an arm secured to said shaft and to the other of said vehicle portions to cause rotation of said shaft in response to relative movements of said vehicle portions, and a leaf spring having one of its end portions secured to said shaft for rotation therewith and its opposite end portion slidably engaging said fulcrum.

3. The structure of claim 2 characterized by and including means for bleeding said valve of excess pressure after actuation thereof.

4. The structure of claim 2 characterized by and including a surge-chamber element secured to said fulcrum for resisting the movement thereof.

5. The structure of claim 2 including automatic means for actuating said piston in response to diminution of pressure in said source, said last named means including a cylinder, an emergency piston movable in said cylinder, a pressure inlet on one side of said emergency piston communicating with said source, shaft means on said side of said piston and positioned for operating contact with said first named bar-actuating piston and yielding means on the opposite side of said piston effective to urge said shaft means into actuating contact with said first named piston in response to diminution of said source pressure below a predetermined level.

References Cited in the file of this patent
UNITED STATES PATENTS 1,865,068     Whittaker _____________ June 28, 1932

FOREIGN PATENTS 1,010,527     France _______________ Mar. 26, 1952